(12) United States Patent
Yao et al.

(10) Patent No.: US 8,653,194 B2
(45) Date of Patent: Feb. 18, 2014

(54) QUASI-MELT PROCESSES FOR SINGLE POLYMER COMPOSITES AND PRODUCTS THEREOF

(75) Inventors: Donggang Yao, Lilburn, GA (US); Youjiang Wang, Atlanta, GA (US); Pan Dai, Beijing (CN); Jinnan Chen, Beijing (CN)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/463,619

(22) Filed: May 3, 2012

(65) Prior Publication Data

US 2013/0123430 A1 May 16, 2013

Related U.S. Application Data

(60) Provisional application No. 61/481,923, filed on May 3, 2011.

(51) Int. Cl.
*C08F 8/00* (2006.01)
*C08J 3/00* (2006.01)
*C08L 23/00* (2006.01)

(52) U.S. Cl.
USPC .......................... 525/191; 525/197; 525/240

(58) Field of Classification Search
USPC .......................................... 525/191, 197, 240
See application file for complete search history.

(56) References Cited

U.S. PATENT DOCUMENTS 4,944,974 A * 7/1990 Zachariades ................. 428/36.1

\* cited by examiner

*Primary Examiner* — Nathan M Nutter
(74) *Attorney, Agent, or Firm* — Troy S. Kleckley; Ryan A. Schneider, Esq.; Troutman Sanders LLP

(57) ABSTRACT

Processes and compounds are described herein for single polymer composites based on a process for making the single polymer composites that includes the steps of heating a matrix material to create polymer melt, cooling the polymer melt to below its $T_m$ to create an undercooled polymer melt, or quasi-melt, and combining the melt with an enhancing or reinforcing material to produce a single polymer composite. The process can produce materials that do not have any degradation of the polymer characteristic of the enhancing material due to melting of the polymer in the enhancing material.

22 Claims, 13 Drawing Sheets

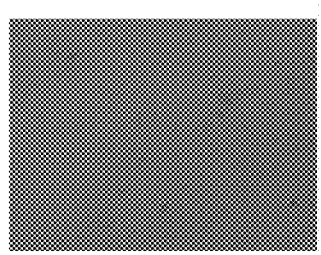 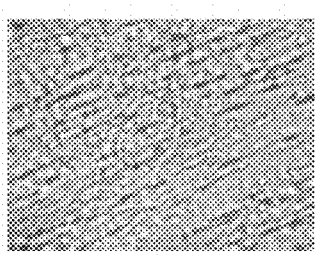 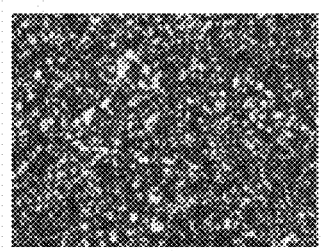
Figure 7(a)    Figure 7(b)    Figure 7(c)
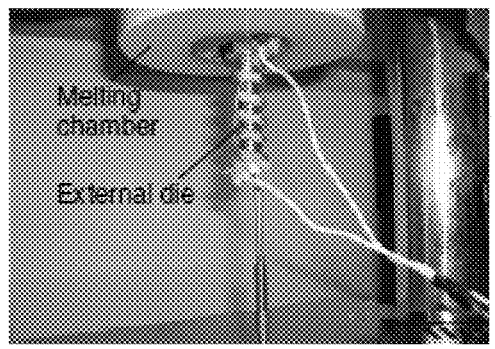
Figure 8(a)
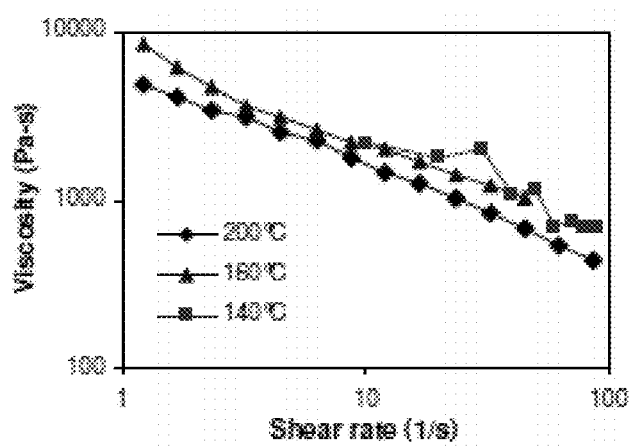
Figure 8(b)

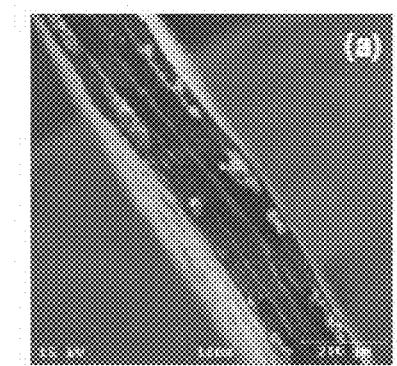 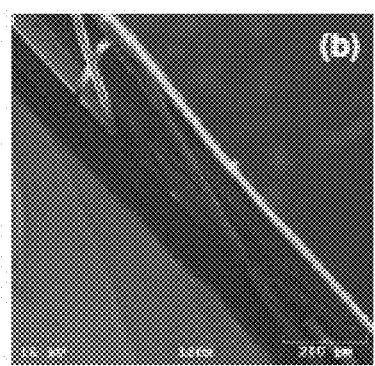
Figure 9(a)    Figure 9(b)
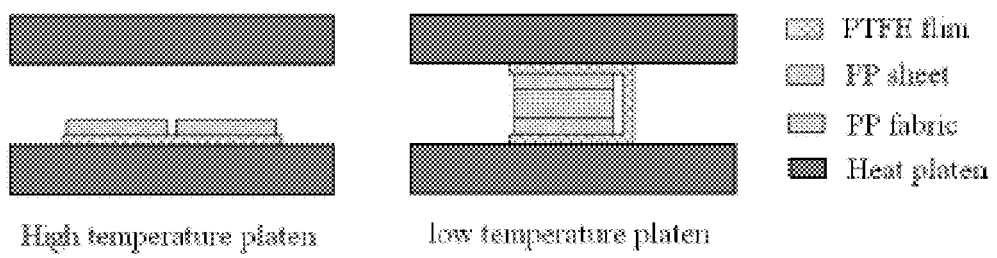
Figure 10

US 8,653,194 B2

QUASI-MELT PROCESSES FOR SINGLE POLYMER COMPOSITES AND PRODUCTS THEREOF

RELATED APPLICATIONS

This application claims, under 35 U.S.C. §119(e), the benefit of U.S. Provisional Patent Application Ser. No. 61/481,923, filed 3 May 2011, the entire contents, references and substance of which are hereby incorporated by reference as if fully set forth below.

TECHNICAL FIELD

The various embodiments of the present disclosure relate generally to a process for preparing single polymer composites containing a matrix material and an enhancing material, where the process allows for combining the components by melt processing at a temperature below the melting temperature of the matrix material. More particularly, the various embodiments provide a process for making single polymer composites and single polymer composites prepared via the process.

BACKGROUND OF THE INVENTION

In general, composites are heterogeneous materials made from a combination of different matrix and reinforcing materials (primarily high-strength, high-stiffness fibers), which are subjected to interfacial compatibility issues, as well as difficulties in recycling. One promising approach for enhanced interfacial properties and improved recyclability is to use a single polymer for both matrix and reinforcement. Although the original concept of single polymer composites (SPCs) was proposed by Capiati and Porter [1] more three decades ago, the progress in SPCs processing has been rather slow. The primary hurdle is due to the proximity in melting temperature between the matrix and the reinforcement. It is well known that the melting temperature of a reinforcing fiber can be raised by increasing crystallinity and perfecting the crystalline structure. However, the resulting change in melting temperature is quite small as compared with a realistic processing temperature window and its variation in standard melt processing, such as extrusion and injection molding. As a result, the fiber would be melted or its mechanical properties would be severely degraded should a standard melt process be used for SPCs processing.

So far, the work in SPCs manufacturing has been focused almost exclusively on a hot compaction process [e.g., 2-7], where polymer fibers are compacted at a temperature very close to, but below, the polymer melting temperature so as to partially melt the fiber and fuse them into a single solid material. The major challenge in this process is the small difference, typically less than 5° or 10° C., between the feasible processing temperature and the fiber melting temperature. Within such a small temperature window, it is difficult to process the SPC under normal processing conditions without significantly annealing the fiber. It is known that polymer fibers annealed at a temperature close to their melting temperature results in a much reduced modulus toward that of the unoriented polymer [5]. Furthermore, the above method relies on the creation of a textile preform before hot compaction, which is not only an expensive procedure but is also limited to simple geometries. This process is also not compatible with standard polymer processing techniques for mass production, such as extrusion and injection molding.

The concept of "overheating" above the fiber melting temperature by constraining fibers was introduced in preparing SPCs [8]. Physically fixing the fiber ends can prevent shrinkage and molecular reorientation [9-11]. To a certain extent, this method can enlarge the processing temperature window. The melting temperature of the constrained PP fiber increased by about 20° C. compared to the unconstrained PP fiber [12]. The overheating behavior of constrained fibers also has been reported for PA6 (polyamide 6) and PET (polyethylene terephthalate), but only melting temperature shifts of 10° C. and 7° C., respectively, were observed [11].

To further enlarge the processing temperature window, researchers have also utilized polymers with same chemical composition but different chemical structures. Teishev et al. [13] reinforced HDPE (high-density polyethylene) matrix with UHMWPE (ultra-high molecular weight polyethylene) fibers, and the process window was enlarged to 20° C. Devaux and Cazé [14] reinforced LDPE (low-density polyethylene) with UHMWPE fibers, and the process window was further enlarged to about 40° C. Pegoretti et al. [15] prepared SPCs based on liquid-crystalline fibers, Vectran®M and Vectran®HS. These two kinds of commercial fibers have the same chemical composition but different melting point. The resulting temperature window for SPCs processing ranged from 260° C. to 285° C. Although manufacturability was greatly enhanced in these composite systems, the interfacial adhesion was found to be lower than the original SPC. Mead et al [2] studied and found that the interfacial shear strength for HDPE films embedded in an LDPE matrix is 7.5 MPa and for HDPE self-composites is 17 MPa. In more rigorous definition, composites involving polymers with same chemical composition but different chemical structures are not true SPCs.

Recently, Yao et al. [16] proposed to widen the processing temperature window utilizing the slow crystallization kinetics of some slowly crystallizing polymers such as PET and PLA (polylactide). A slowly crystallizing polymer can be supercooled into a nearly amorphous phase. This amorphous material can then be liquefied by rapidly heating to a temperature well above the glass transition temperature ($T_g$) but considerably below the melting temperature ($T_m$) and combined with high-strength fibers to form an SPC. With this approach, the processing temperature window for PET SPCs was extended to about 70° C. However, there are two competing processes occurring when an amorphous polymer is heated. In order to avoid premature crystallization before fusion, the amorphous polymer needs to be heated rapidly throughout the entire thickness. This method is limited to polymers with a relatively long crystallization half-time; it is difficult to apply it to fast crystallizing polymers, including PP, PE and PA6/66.

Thermal liquid crystal polymers (TLCPs) are known to supercool when cooled below their melting point [18,19]. Done and Baird [18] studied the rheology of liquid crystal polymers below their normal melting temperature by measuring dynamic mechanical properties. It was found that the TLCPs could be supercooled to 50° C. below their normal melting temperatures and can still be deformed. Extrusion studies on these materials were also carried out, and it was observed that in this supercooled state the polymer extrudate exhibited significant die swell. These results demonstrated that undercooled TLCP melts can be processed using normal melt processing techniques. Not only TLCPs but also typical thermoplastic polymers may be processed in a supercooled liquid state. This is supported by the typical crystallization thermograms observed in differential scanning calorimetry (DSC). For instance, PP was found to exhibit a large degree of supercooling (~40° C.) under normal cooling rates (~20° C./min) in DSC [20]. However, the supercooling properties of thermoplastic polymers have not been explored in SPCs processing, and a feasible melt processing technique for SPCs processing is not known.

Despite these efforts, there remains better processing protocols for SPCs, that are compatible with standard high-throughput melt processes for polymers/plastics.

SUMMARY

The various embodiments herein provide a process for preparing single polymer composites, single polymer composites prepared by the process, and single polymer composites that maintain the structural characteristics of the precursor materials.

An exemplary embodiment can be a process for preparing a single polymer composite, where the process includes the steps of heating a polymer compound, i.e. a matrix material, to above its melting temperature ($T_m$) to create a polymer melt, cooling the polymer melt to a second temperature $T_q$ below the $T_m$ to create an undercooled polymer melt, and combining the undercooled polymer melt with an enhancing material to form the single polymer composite. The matrix material and the enhancing material can be the same polymer. The polymer can be a polyolefin, polyamide or polyester, including but not limited to polyethylene, polypropylene, nylon-6, nylon-66, PET, PBT, or PTT. The polymer can be polyethylene, polypropylene, nylon-6, or PET; polypropylene, nylon-6, or PET; or polypropylene.

In an exemplary embodiment, the polymer melt can be cooled to a temperature $T_q$ that is at least 5 degrees C. below the $T_m$ of the matrix polymer, or at least 10 degrees C. below the $T_m$, or at least 15 degrees C. below the $T_m$, or at least 20 degrees C. below the $T_m$, or at least 5 degrees C. below the $T_m$, or at least 25 degrees C. below the $T_m$ to create an undercooled polymer melt. The undercooled polymer melt can be held at $T_q$ for at least 5 seconds, at least 10 seconds, or at least 15 seconds.

In an exemplary embodiment, the matrix polymer and the enhancing material can be combined in the single polymer composite such that the enhancing material makes up about 5% to about 95% by weight of the single polymer composite, including at least about 5% by weight, at least about 10% by weight, at least about 25% by weight, at least about 33% by weight, at least about 40% by weight, at least about 50% by weight, or at least about 75% by weight.

Another exemplary embodiment can be a single polymer composite prepared by a process of heating a polymer compound, i.e. the matrix material, to above its $T_m$ to create a polymer melt, cooling the polymer melt to a temperature $T_q$ below its $T_m$ to create an undercooled polymer melt, and combining the undercooled polymer melt with a enhancing material to form the single polymer composite. The single polymer composite can be prepared according to the process elements set forth above for the process.

Another exemplary embodiment can be a single polymer composite comprising a polymer matrix and an enhancing material in which the enhancing material maintains at least a portion of a polymer characteristic in the single polymer composite. The enhancing material can maintain at least about 10% of the polymer characteristic, at least about 25% of the polymer characteristic, at least about 50% of the polymer characteristic, or at least about 75% of the polymer characteristic.

BRIEF DESCRIPTION OF DRAWINGS

FIGS. 7(a)-(c) illustrate crystallization micrographs for supercooled nylon-6, in accordance with exemplary embodiments of the present disclosure.

FIG. 8(a) illustrates ram extrusion in accordance with exemplary embodiments of the present disclosure.

FIG. 8(b) illustrates viscosity versus shear rates from the ram extrusion of FIG. 8(a), in accordance with exemplary embodiments of the present disclosure.

FIGS. 9(a)-(b) illustrate fracture surface appearances of a PET fiber SPC and a glass fiber PET composite, in accordance with exemplary embodiments of the present disclosure.

FIG. 10 illustrates a device for SPC manufacturing, in accordance with exemplary embodiments of the present disclosure.

DETAILED DESCRIPTION

Figure 1:
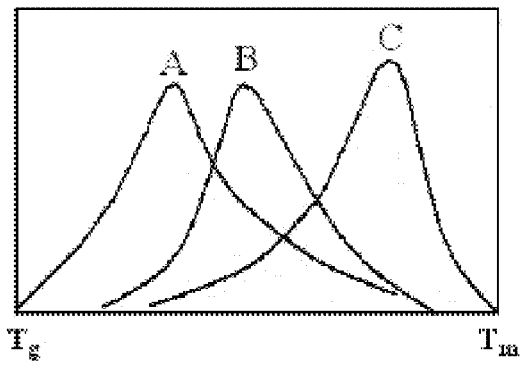
FIG. 1 illustrates polymer crystallization curves in accordance with exemplary embodiments of the present disclosure.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The various embodiments of this disclosure are directed to a process for preparing single polymer composites (SPCs) and SPCs that can now be achieved due to the discovery of that process. SPCs are composites composed generally of enhancing materials and matrix made from the same polymer. material, or the main constituting material for both the matrix and the enhancing material, are made from the same polymer. The terminology "same polymer" refers to a polymer with a particular chemical composition and repeating unit although molecular weight and polydispersity for this polymer may be varied. Because a single polymer is employed, SPCs can have superior mechanical properties (due to improved chemical/physical compatibility at the fiber-matrix interface), reduced weight, and enhanced recyclability. The enhancing material and the matrix that are prepared from the same polymer have similar melting temperatures, so previous progress in developing and commercializing SPCs has been largely hindered due to the lack of feasible melt-processing methods. Those hindrances can be overcome with various embodiments of this disclosure.

As used throughout the specification, a SPC can be composed of at least two elements or materials: First, a matrix material that can be prepared from a polymer melt. This can also be referred to as the matrix, the polymer matrix, or the polymer body. Second, an enhancing material that can be contained as part of the SPC and can be in contact with the matrix material. The enhancing material can also be referred to as the reinforcing material.

In an embodiment of the present disclosure, the matrix material can be heated to above its melting point, $T_m$, then cooled to below $T_m$. In general, polymer crystallization can occur over a large temperature range from $T_g$ to $T_m$. Crystallization typically experiences two distinct stages: nucleation and crystal growth. FIG. 1 schematically shows the rate of nucleation (A), the rate of crystallization (B), and the rate of crystal growth (C) as a function of temperature. Lower temperature is favorable for the formation of nuclei while higher temperature is favorable for the growth of crystal. When the processing temperature is below and close to the melting temperature, crystallization can be effectively suppressed. Because there are no nuclei near the melting temperature, the polymer cannot crystallize although the rate of crystal growth is high. Then the supercooling effect arises.

This undercooling or supercooling then refers to a process where a substance is cooled below a phase-transition temperature without the transition occurring. It is well know that some low molecular weight liquids such as water can be supercooled well below the freezing point without freezing. In general, polymer can be even easier to supercool because of their extremely high molecular weight and long molecular chain.

This undercooled or supercooled melt can also be referred to as a quasi-melt. A quasi-melt is defined as a mesa-state liquid that is able to maintain a fluidic state at a temperature well below the nominal melting temperature of the polymer. Because the quasi-melt maintains its fluidity, SPCs can be processed using this melt without issues of melting and damaging the enhancing or reinforcing material. Therefore, an embodiment of this disclosure provides for forming a quasi-melt and allowing it to combine with reinforcing fibers in melt processing. The applicability of undercooled melt in SPCs processing can depend on the degree of undercooling that the polymer can undergo without solidification—the larger the degree of undercooling, the less potential of heat damage to the strength of the polymer fiber. This approach can be applied to a variety of semi-crystalline polymers.

Surprisingly, the undercooled melts can be maintained for a long period of time, and can be manipulated as any normal molten polymer liquid, including pumping, drawing, mixing, liquid flow across a substrate or mold, and so forth. As one non-limiting example, a undercooled polypropylene melt can be maintain at 140° C., 30° C. below its $T_m$ for over two minutes. More generally, stable quasi-melts for a number of polymers can be created at temperatures below the melting temperature. These quasi-melts, in a liquid state, can be combine with high-strength fibers and form an SPC with excellent mechanical properties. An undercooled melt in SPCs processing allows introduction of an enhancing material into a liquid matrix at a temperature well below the matrix melting temperature. Because the processing temperature is below the matrix melting temperature, and the enhancing material's melting temperature is even higher than the matrix melting temperature (due to orientated crystals), the enhancing material added to the matrix will not melt and therefore can reinforce the matrix and form an SPC. Such a process is contrary to traditional textbook methods of heating to melting, mixing, and then cooling the product, where flow is conducted above the melting temperature. Using this process, in an exemplary embodiment, a matrix material and an enhancing material can be the same polymer. Two nonlimiting examples of this process are set forth below.

Figure 2:
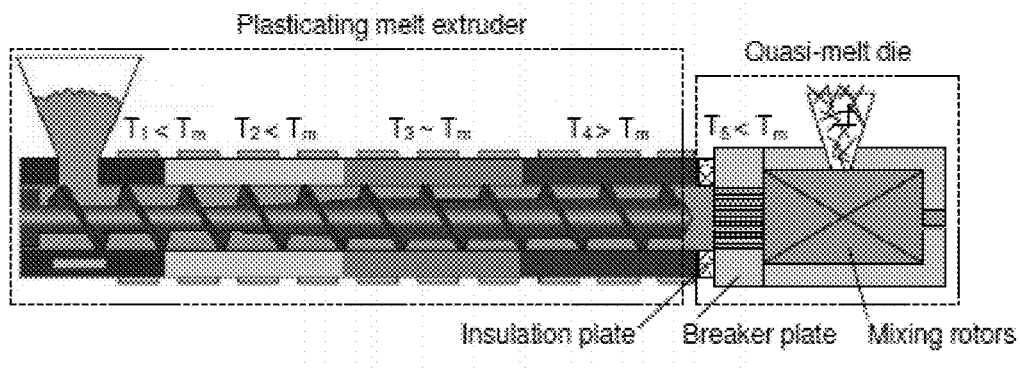
FIG. 2 illustrates an extrusion devices for SPC processing in accordance with exemplary embodiments of the present disclosure.

In a nonlimiting example, a quasi-melt extrusion of SPCs can be prepared using the standard melt extrusion process. The temperature profile can be set up so that the polymer is melted, pumped and then remains at a temperature above the melting temperature before it emerges out of the die orifice/outlet. However, in contrast to normal methods, the temperature of the die for quasi-melt extrusion can be set to a temperature substantially lower than the polymer melting temperature. FIG. 2 shows a schematic of quasi-melt extrusion for SPC processing, where $T_i$ is the temperature of the ith zone. The quasi-melt die can be designed as a special extender of the barrel, but is thermally isolated from the barrel by an insulation plate. A separate breaker plate, or distribution plate, set at the lower temperature can be used to evenly cool and distribute the hot melt before it enters the die chamber. The polymer fibers can be directly introduced to the die chamber, rather than into the screw extruder as in standard extrusion. As a barrel extender, the die chamber also houses a rotary mixing element. All these salient features allow the polymer fibers to compound with a supercooled quasi-melt and form an SPC. Many modifications of this setup is possible; however, a key element is the generation of a quasi-melt and the use of this quasi-melt in forming SPCs.

In another non-limiting example, a matrix material can be prepared using a pair of matrix sheets. The polymer matrix can be prepared from normal starting material under normal methods. The matrix sheet can then be heated to above its $T_m$ on a heated plate, then transferred to a separate plate, or allowed to cool on the first plate, to produce a undercooled polymer melt. An enhancing material can then be laid atop the undercooled polymer melt and laminated or rolled to produce the eventual SPC.

Therefore, in an embodiment, a process for preparing a SPC can include heating a matrix material to above its $T_m$ to create a polymer melt, cooling the polymer melt to a temperature $T_q$ to create an undercooled polymer melt (or quasi-melt,) and combining the undercooled polymer melt with an enhancing material. The SPC can be cooled, or can be further processed. For example, the process can include any further processing steps that one or ordinary skill in the art would conduct. The SPC can be further processed by extrusion, pultrusion, injection molding, calendering, compression molding, or other liquid processing steps.

In an embodiment, the polymer matrix and the enhancing material comprise the same polymer material. The present process allows for preparation of polymer composites having the same polymer, but in which the enhancing material (or reinforcing material) can be added in a solid form and not lose any characteristic structure or stability due to melting or softening of the enhancing material. Note that the process can also be used for a mixed enhancing material, where the enhancing material might be composed of more than one polymer or substrate, e.g. a woven sheet having two different polymers, or a polymer coated material. Preferably, particularly for recycling purposed, the enhancing material is a single polymer and analogous to the matrix polymer.

In an embodiment of the process, the polymer can be any polymer compound used by one of ordinary skill in the art to prepare a composite. The polymer can be a polyolefin, a polyester, or a polyamide, including but not limited to polyethylenes, polypropylenes, or other polyalkenes; polyacrylates; polyamides such as nylon-6, nylon-66; polyesters including polyethylene-type esters, polypropylene-type esters, polybutylene-type esters, polytrimethylene-types esters, terephthlates, naphthalates, adipates, etc.; polylactic acids, polyglycolides, polycaprolactones, and so forth. In an embodiment, the polymer can be polyethylene, polypropylene, nylon-6, nylon-66, PET, PBT, or PTT. Alternatively, the polymer can be polypropylene, nylon-6, or PET; or the polymer can by polypropylene The polymer must be able to maintain an undercooled melt, i.e. a quasi-melt, at a temperature below its $T_m$. The temperature at which the quasi-melt is cooled to can be designated $T_q$, where $T_q$ is some temperature below the polymer's $T_m$. In an embodiment of the process, $T_q$ can be at least 5° C. below $T_m$, at least 10° C. below $T_m$, at least 15° C. below $T_m$, at least 20° C. below $T_m$, or at least 25° below $T_m$. In an embodiment, $T_q$ can be between about 15° and about 25° below $T_m$. In an embodiment of the process, the quasi-melt can be held at $T_q$ for at least 5 seconds, at least 10 seconds, or at least 15 seconds; and the quasi-melt can be held at $T_q$ for up to 30 seconds, up to 60 seconds, or up to 120 seconds.

The quasi-melt can be pumped like a liquid into any container or machine that would be used by one or ordinary skill in the art when transferring or utilizing molten polymer liquids or polymer melts. For that reason, SPCs based on the polymer melt can be created in any shape or form used in polymer processing. In addition, the quasi-melt can be combined with the enhancing material over a wide ratio. In an embodiment of the process, the quasi-melt and the enhancing polymer can be in any ratio, including from 1:20 to 20:1, from 1:10 to 10:1, from 1:5 to 5:1, from 1:4 to 4:1, from 1:3 to 3:1, or even about 1:2 to 2:1. The enhancing material can make about 5% to about 95% by weight of the SPC, from about 10% to about 90%, from about 25% to about 75%, or from about 33% to about 66%. The enhancing material can be at least about 5% by weight of the SPC, including at least about 10% by weight, at least about 15% by weight, at least about 20% by weight, at least about 25% by weight, at least about 33% by weight, at least about 50% by weight, at least about 66% by weight, and at least about 75% by weight. In an embodiment, the matrix material can be at least about 5% by weight of the SPC, including at least about 10% by weight, at least about 15% by weight, at least about 25% by weight, at least about 33% by weight, at least about 50% by weight, at least about 66% by weight, and at least about 75% by weight, or at least about 90% by weight. At some concentrations, the enhancing material can be improving a characteristic of the matrix polymer. At some concentrations, the matrix polymer can be thought of as a glue that could, for example, hold together a bundle of threads or yarns.

The enhancing material can be in any form known to one of ordinary skill in the art. In an embodiment, the enhancing material can be any material used as a reinforcing material. The enhancing material can be any material that improves a mechanical property of a composite, such as for example, strength, rigidity, structural integrity, or crystallinity. In an embodiment, the enhancing material can be a woven material, such as fabric or mat or thread; a yarn or staple; a tape; or a film. The enhancing material can be a preformed shape, or can be any material that adopts the shape of a mold. One advantage of this process is that there are no limits to how the composite can be processed because the quasi-melt can be handled like a liquid or polymer melt, and the enhancing material is not damaged or degraded by contact with it.

Because the enhancing material can be combined with an undercooled polymer melt that is substantially below the melting point of the polymer, the enhancing material does not lose the characteristics associated with the material, e.g. the crystallinity or morphology of the polymer structure in the enhancing material is not damaged or degraded. In an embodiment, the enhancing material can maintain at least 10% of a polymer characteristic or at least 25% of a polymer characteristic when combined with the quasi-melt to form the composite. Alternatively, it can maintain at least 50%, or at least 75%, or at least 90% of the polymer characteristic. The polymer characteristic can be any characteristic known to one of ordinary skill in the art for enhancing materials, such as for example, strength, rigidity, structural integrity, crystallinity, morphology, and so forth.

An exemplary embodiment of the present disclosure can also be a single polymer composite prepared according the process set forth above, having each and every claim aspect set forth above, as if repeated here.

Moreover, with the present process, single polymer composites having a matrix material and a enhancing material composed of the same polymer can now be prepared in which a polymer characteristic of the enhancing material is not severely degraded, and even not degraded at all, in contrast to previous efforts in the art. Therefore, an embodiment of the present disclosure is an SPC that can maintain at least 25% of a polymer characteristic of the enhancing material when combined with the quasi-melt to form the composite. Alternatively, it can maintain at least 50%, or at least 75%, or at least 90%.

With the current process, single polymer composites can be created that have the improved properties typically associated with heterogeneous composites, such as, for example, improved strength, improved rigidity, or tailorable dimensional properties such as higher strength in one direction in a preformed enhancing fabric. The current process allows for combining the concepts of traditional plastic materials with many of the benefits associated with composites, including moldings, forms, shapes, preformed complex shapes, controlled morphology, etc. The SPCs made by this process can have enhanced mechanical properties compared with other heterogeneous composite materials due to a more compatible fiber-matrix interface. Because a single polymer is involved, the extruded/molded SPCs can be recycled using the same recycle protocols for virgin polymers. The elimination of the complicated sorting and separation steps in recycling traditional composites implies less energy and crude oil consumption for making virgin polymers. The enhanced mechanical properties and recyclability, together with reduced weight, make these materials desirable the automotive, marine, building and construction, appliances, and sportswear industries.

Figure 3:
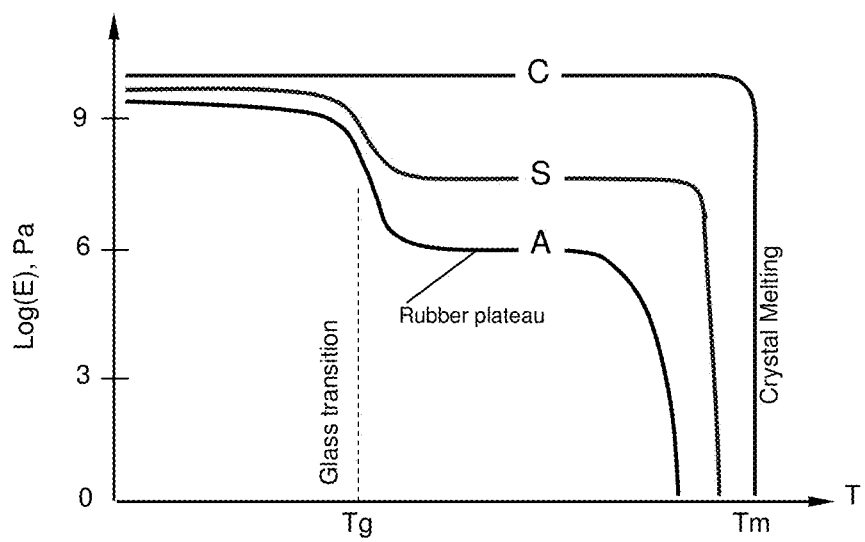
FIG. 3 illustrates temperature effects on various types of polymers in accordance with exemplary embodiments of the present disclosure.

Compounds and processes disclosed herein can be further understood in view of a basic understanding of aspects of technology in the field. For polymer melt processing, FIG. 3 shows typical modulus vs. temperature curves for thermoplastic polymers. An amorphous polymer (A) can experience a large decrease in modulus, approximately three orders of magnitudes, at the glass transition temperature ($T_g$). Above $T_g$, the amorphous polymer can be a rubbery material. The width of the rubber plateau can be dependent on the degree of chain entanglement. When the rubber plateau termination temperature is reached, the polymer turns into a liquid. In order to liquid-process an amorphous polymer, the processing temperature needs to be higher than the termination temperature. For example, polystyrene has a $T_g$ of 100° C., but the molding temperature is typically set above 250° C., 150° C. higher than $T_g$. In contrast, a highly crystalline polymer (C) holds a distinct melting temperature. Most crystalline polymers are semicrystalline, and their behavior is influenced by both $T_g$ and $T_m$, depending on crystallinity. Common semicrystalline polymers (S), such as PP, PE and nylon, have crystallinity varying from 30 to 90%. In order to melt-process these polymers, the processing temperature needs to be higher than $T_m$. Detailed accounts on the conditions for melt processing are described in typical polymer processing textbooks. However, with this "textbook approach", single-polymer composites are difficult, if not impossible, to melt-process.

The strength and modulus of polymer can be highly structure dependent. Bulk pieces of polymer, due to the lack in orientation and/or crystallization, typically have a modulus approximately 1 GPa and a strength of 50 MPa or below. For example, injection molded PP, PE, PET, and nylon have properties fallen into these ranges. In contrast, highly oriented and highly crystalline polymer fibers can have a modulus above 100 GPa and a strength exceeding 3 GPa. For example, gel-spun polyethylene fibers exhibit mechanical properties in these ranges. Note that these numbers are nearly 100 times higher than the nominal properties of the corresponding bulk material.

By integrating high-strength fibers into a matrix of the same polymer, a single-polymer composite can be produced with enhanced mechanical properties. As compared with heterogeneous composites such as glass fibers reinforced composites, SPCs are more environmentally friendly and can be treated as a single polymer during recycling. The single-polymer system also improves the interfacial compatibility between the fibers and the matrix, leading to improved toughness and impact performance. For these reasons, there has been consistently growing interest in manufacturing of SPCs, particularly during the past 20 years. SPCs have been successfully manufactured for a variety of different polymers, including PE, PP, PET, polyethylene naphthalate (PEN), poly (lactic acid) (PLA), polyamides, poly (methyl methacrylate) (PMMA), etc. This trend in technological development in composites manufacturing is primarily driven by the increasing concern on the environment and thus the need of environmentally friendly composite materials.

Despite these advantages, SPCs manufacturing presents a unique set of technical problems in composites manufacturing. For traditional thermoplastic composites, melt/liquid state processing is the primary method; fibers are mixed with the matrix material at a temperature above the Tm of the matrix. This method, however, does not work for SPCs, since the fibers would be melted or the fiber properties would be severely degraded. So far, the work in SPCs manufacturing has been focused almost exclusively on a fiber hot compaction process, where polymer fibers are compacted at a temperature very close to, but below, the fiber melting temperature so as to partially melt the fiber and fuse them into a single solid material. The essence of the process is to melt only the surface fraction of each fiber under a comparatively low contact pressure, and then to apply a substantially higher pressure for a short time to achieve excellent consolidation of the structure. The recrystallized polymer acts to bind the fibers together like the resin matrix in a fiber/resin composite. The major challenge in this process is the small difference, typically about 5° C. or below, between the feasible processing temperature and the fiber melting temperature. Within this small temperature window, it is difficult to process the SPC under normal processing conditions without significantly annealing the fiber. It is known that annealing polymer fibers at a temperature close to their melting temperature results in a much reduced modulus toward that of the unoriented polymer. Furthermore, the above method relies on the creation of a textile preform before hot compaction, which is not only an expensive procedure but is also limited to simple geometries. Therefore, there emerges a need for the development of better processing protocols for SPCs, preferably compatible with standard high-throughput melt processes for polymers/plastics.

Figure 4:
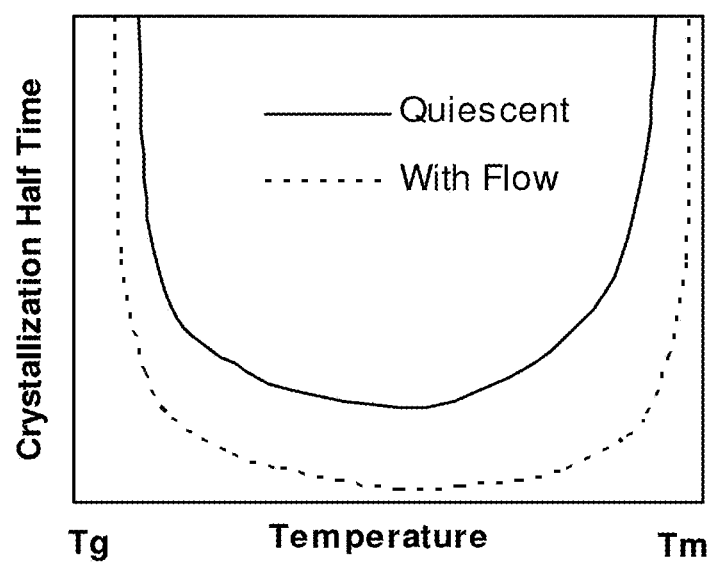
FIG. 4 illustrates crystallization half-times for polymers, in accordance with exemplary embodiments of the present disclosure.

A brief account on the kinetic effects related to quenching and flow on crystallization can also be helpful. Upon cooling, a crystallizable polymer can undergo both microscopic and macroscopic changes to convert from a conformationally disordered state to a more ordered crystalline state. Crystallization occurs between $T_g$ and $T_m$. Typically, a supercooling of 15 to 20° C. below $T_m$ is needed to initiate crystallization at a reasonable rate. The plot of half-time of crystallization against temperature typically assumes a bell shape, with longer time towards the two ends of $T_g$ and $T_m$, as shown in FIG. 4. The extent of the crystalline transformation can vary from 10 to 90% depending on the polymer, the molecular weight and crystallization temperature. In practice, one is always dealing with a non-equilibrium or meta-stable state. For this reason, polymers can be supercooled; if the polymer melt is rapidly quenched to blow $T_g$, an amorphous glass is formed. In polymer processing, the time scale of processing may be comparable to that for crystallization. The actual crystalline morphology of a molded or extruded product is, therefore, highly contingent upon the thermo-mechanical history that the material experiences during processing.

Besides thermally induced crystallization, flow or deformation can cause crystallization. The second mechanism is principally important in polymer melt processing, since extremely high levels of deformation rates ($\sim 10^3$ s$^{-1}$ or above) are involved in molding, extrusion and fiber spinning. It is generally believed that flow causes molecular alignments (or orientations) and, as a result, reduced the free energy for crystallization. A schematic comparison between quiescent crystallization and flow-induced crystallization is given in FIG. 4. It can be seen that, with flow and stresses, the temperature window for crystallization enlarges. Furthermore, the half time of crystallization dramatically decreases. When modeling the flow influences on crystallization, the dominating approach has been to modify the equilibrium melting temperature in the bulk free energy term of the quiescent crystallization theory. This effect is often referred to as the "melt temperature elevation effect", which was first quantified by Flory.

Reference will now be made in detail to specific aspects of the disclosed materials, compounds, compositions, articles, and methods, examples of which are illustrated in the accompanying Examples and Figures.

EXAMPLES

Example 1

Quasi-Melts and $T_q$

Semicrystalline polymer with a relatively high molecular weight can form a stable quasi-melt at a temperature well below the melting temperature. Experiments involving DSC (differential scanning calorimetry), parallel-plate rotational rheometry, polarized microscopy, and ram extrusion demonstrated that a quasi-melt of undercooled polymer melt can be created. Supercooled melts of PP, nylon, and PET can maintain a fluidic or viscous state for a long period of time (~2 minutes or longer) at a temperature at least 20° C. below the polymer's melting temperature. Moreover, the viscosity of the quasi-melt is only moderately higher than that of the intrinsic melt above the melting temperature. For example, PP, with Tm at 170° C., can be extruded at 140° C. on a ram extruder with a designed temperature profile, and PET, with Tm at 260° C., can form a quasi-melt at 220° C., and this quasi-melt can be combined with high-strength PET fibers to form a single-polymer composite.

Figure 5:
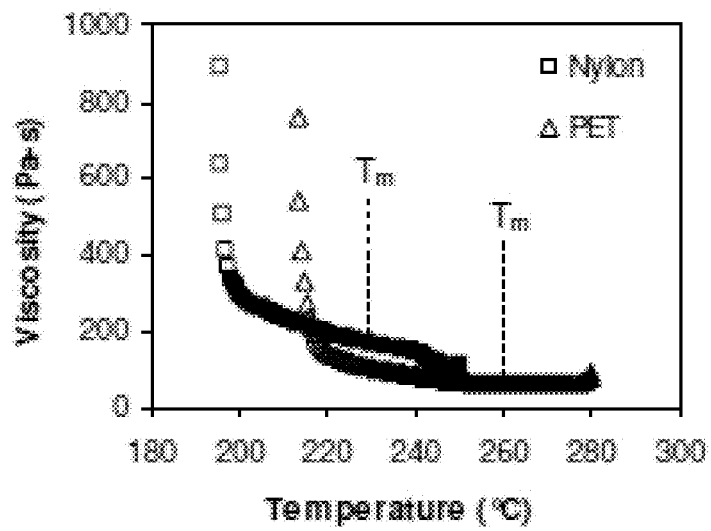
FIG. 5 illustrates viscosity effects for changes in temperature for nylon and PET in accordance with exemplary embodiments of the present disclosure.

Rotational rheometry and confocal optical microscopy was used to examine the feasibility of creating a stable polymer quasi-melt. FIG. 5 shows the viscosities of nylon 6 and PET as a function of temperature during cooling. The cooling rate was 5° C./min and the shear frequency was 100 Hz (Due to the limitation of the rheometer in the standard design, employment of faster cooling rates was not possible). For both polymers, the liquid state was maintained at least 30° C. below the corresponding melting temperature. From the data it can also be seen that the viscosity of the quasi-melt was only moderately higher than that of the polymer melt above Tm.

Figure 6:
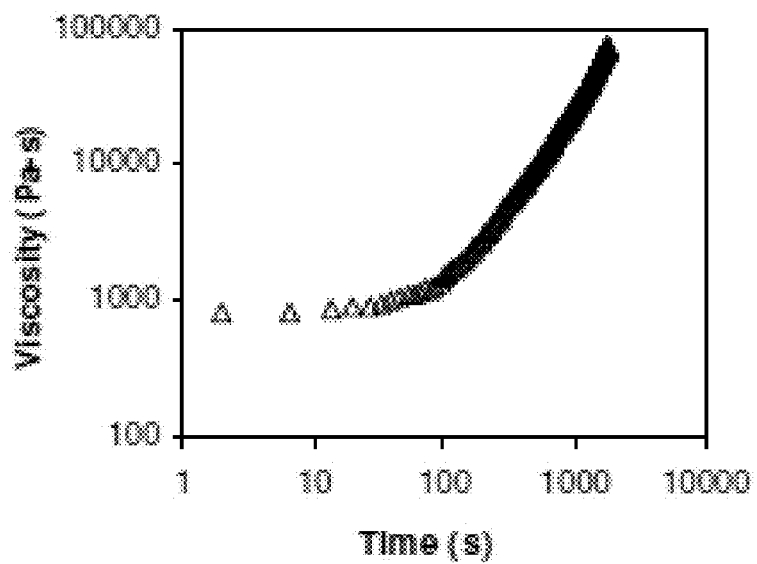
FIG. 6 illustrates viscosity changes over time for undercooled polymer melts in accordance with exemplary embodiments of the present disclosure.

Similar experiments were conducted for PP having a Tm at 170° C. The liquid state of PP was maintained at 130° C. under the experimental conditions given above. The findings were similar to those of nylon and PET. Since the viscosity of PP (an ultrahigh molecular grade) was much higher than those of the nylon and the PET samples, the PP data is not included in FIG. 5. After the polymer melt cooled to a target supercooling temperature, time-sweep experiments were also conducted. FIG. 6 shows the change of viscosity over time for polypropylene at 100 Hz and 140° C., 30° C. below $T_m$. It can be seen that, even at this deep supercooling, PP did not experience a significant increase in viscosity for about two minutes. The crystallization kinetics of deeply supercooled polymer melts was also studied. FIGS. 7a-c show crystallization of a supercooled nylon 6 melt (cooled at a rate of 20° C./min) at 200° C. 25° C. below the melting temperature, observed under a confocal optical microscope. (a—startup, b—crystallization initiated after 2 minutes, c—after fully crystallized) The initiation of crystallization occurred after about two minutes of induction time, indication that the fluidic state can be maintained at least for 2 min at this temperature.

Example 2

Ram Extrusion

Ram extrusion was performed on a capillary rheometer. However, for the standard capillary rheometer, the die temperature and the melt chamber temperature cannot be separately controlled. An external die with an independent heating element and a separate temperature control unit was fabricated and retrofitted to the capillary rheometer (FIG. 8(a)). Heating was performed by electrically insulated heating wires wrapped around the die surface. PP was used as a testing polymer. At the start of the experiment, both the chamber temperature and the die temperature were set to 200° C. After steady flow was developed, the die temperature was gradually reduced to its final target temperature. With this procedure, stable flow was achieved at die temperatures as low as 140° C., 30° C. below the melting temperature of PP. This indicated that, after deep cooling below the melting temperature, PP still kept a fluidic state. The experimental pressure and flow rate data were used for viscosity versus shear rate at different die temperatures, as shown in FIG. 8(b). The viscosity of the supercooled melt was only slightly higher than at 200° C., indicating excellent processability of the quasi-melt under these processing conditions. The data at 140° C. was noisy. This may be caused by the limitations of the preliminary setup, particularly the oversimplified setup for heating and temperature control. On the other hand, this also indicated the increased sensitivity of quasi-melt flow at the lower temperature end, where crystallization might have become important.

Example 3

SPCs Processing with Quasi-Melt

PET, with a melting temperature of 260° C., was used for SPCs processing. A PET quasi-melt film was produced on a heated plate at 220° C. Highly drawn PET fibers were added to the quasi-melt in a unidirectional pattern. The liquid film was then folded and compression molded at the same temperature. FIG. 9(a) shows a fracture surface appearance for the PET SPC; nearly no fibers were pulled out on the fractured surface, indicating excellent interracial bonding achieved between the fibers and the matrix. For comparison, the fracture surface appearance of a glass fiber reinforced PET sheet is shown in FIG. 9(b). For this heterogeneous composite, fibers can be clearly seen at the fracture surface. With 30% PET fibers as reinforcement, the PET SPC sheet had a tensile strength about 5 times higher than the non-reinforced PET sheet.

Example 4

Polypropylene SPC Creation and Evaluation

PP granules were supplied by Phillips Sumika Polypropylene Company, with a density of 0.905 g/cm$^3$ at room temperature and a melt flow rate of 3.8 g/10 min at 230° C. High-strength woven polypropylene cloth was supplied by Innegrity LLC (Simpsonville, S.C.). The weft and warp yarns were made from identical high-tenacity yarn with strength of 590 MPa. Each yarn consisted of 225 bulked continuous filaments with a filament diameter of about 48 μm. The yarn was woven into plain weave fabric of 423.8 g/cm$^3$, and the warp density and the weft density are 4.3 threads/cm and 6 threads/cm, respectively.

Thin PP sheet, 0.5 mm in thickness, were prepared by compression molding the PP granules at 200° C. and 1 MPa for 5 min followed by quenching at room temperature. The molded PP sheets were then melted and consolidated with the high-strength PP fabric to form an SPC using a customized two-station compression molding process, as schematically illustrated in FIG. 10. The two station process allows the PP sheets to be heated and melted at one temperature and then undercooled to a second temperature within a short period of time. Specifically, two pieces of PP sheets were first heated to 200° C. for 10 min on the first station to obtain two layers of molten PP sheets. The molten PP sheets were then quickly transferred to the second station set at a lower temperature, where the molten PP sheets were supercooled. After the undercooled PP melt sheets were stabilized on the second station, a PP fabric was inserted in between and the lamination was immediately compressed under a pressure of 9 MPa for 10 min. Then the lamination was removed and cooled to room temperature. For all experiments, the PP fabric was preheated with no pressure to the same temperature as that of the second station before it was introduced to the undercooled PP melt layers.

A differential scanning calorimeter (Q200, TA Instruments) was employed for thermal analysis of PP fabric and PP matrix. The unconstrained PP fabric was heated from 40° C. to 200° C. at a rate of 10° C./min The PP matrix was heated from 40° C. to 200° C. at a rate of 10° C./min, held for 10 min at 200° C., and then cooled back to 40° C. at varied cooling rates (1, 10, 20 and 30° C./min). The holding stage was considered necessary to erase possible effects of thermal history of the sample on the subsequent melt crystallization.

Isothermal crystallization behaviors of PP matrix at different temperature were also investigated. The matrix PP was heated to 200° C. and after held at this temperature for 10 min rapidly cooled to a predetermined temperature $T_q$ (125, 130, 135, 140, 145 and 150° C.) for isothermal crystallization. At last the matrix PP was cooled to 40° C. at a rate of 10° C./min.

X-Ray measurements, rheological measurements, tensile tests, and dynamic mechanical analysis were conducted on samples. The changes in fiber orientation were studied using wide angle X-ray diffraction (WAXD). WAXD patterns were obtained on multi-filament bundles by Rigaku Micromax-007 (operated at 45 kV, 66 mA, wavelength=1.5418 A°) using Rigaku R-axis IV++ detection system. The diffraction patterns were analyzed using AreaMax V.2.00 and MDI Jade 7.1.

Dynamic rheological properties were measured on a parallel-plate rotational rheometer (AR2000ex, TA Instruments). The plate diameter and the gap between the plates were 25 mm and 1 mm, respectively. The strain applied was 1%. The PP sheets were melted and equilibrated at 200° C. The initial gap was set to a value equivalent to the final gap plus 50 μm. After the excessive sample squeezed out was carefully trimmed off, the upper plate was moved to the final gap size. To remove the existing crystallization and residual stress, the melted PP sheet was held for about 10 min at the heating temperature and then cooled at a rate of 10° C./min for temperature ramp rheological measurements. The PP sheets were also cooled to the predetermined temperature at a rate of 10° C./min for time sweep rheological measurements.

Tensile tests were carried out on a tensile test machine (Instron Universal Testing Machine 5166 Series, Instron Corp., MA) at room temperature with a crosshead speed of 5 mm/min. The PP sheet and its SPCs were cut into dog-bone shaped testing specimens using a cutting die according to DIN-53504. The SPCs were tested in the weft and warp directions, and 5 specimens were tested for each sample.

A dynamic mechanical analyzer (Q800, TA Instruments) was employed for dynamic mechanical thermal analysis (DMTA) of PP fiber, PP sheet and PP SPC. The measurements were carried out at a strain of 0.1%, a frequency of 1 Hz, and a temperature ramping rate of 1° C./min.

Figure 11:
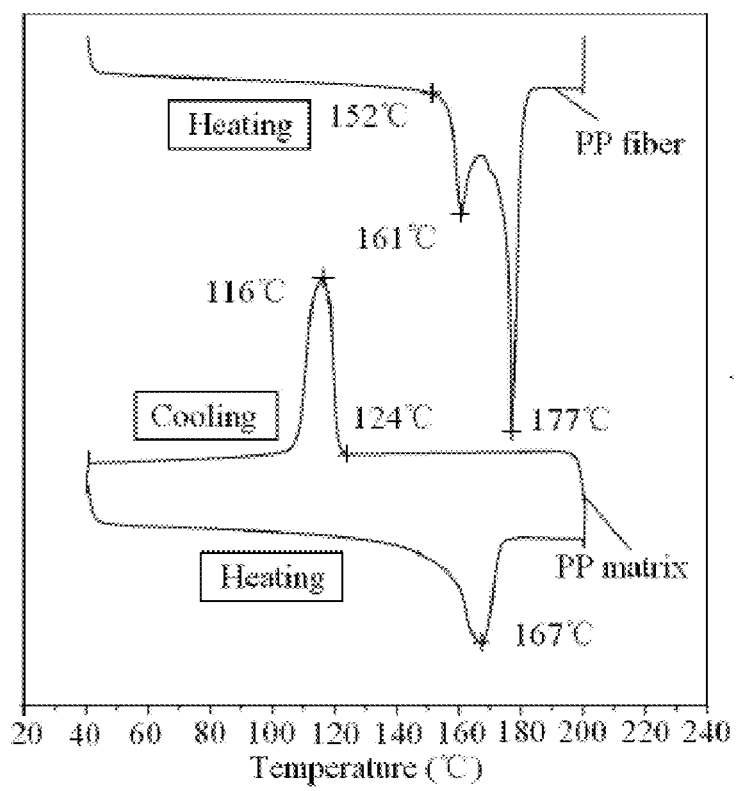
FIG. 11 illustrates DSC thermographs for various polypropylene materials, in accordance with exemplary embodiments of the present disclosure.
Figure 12:
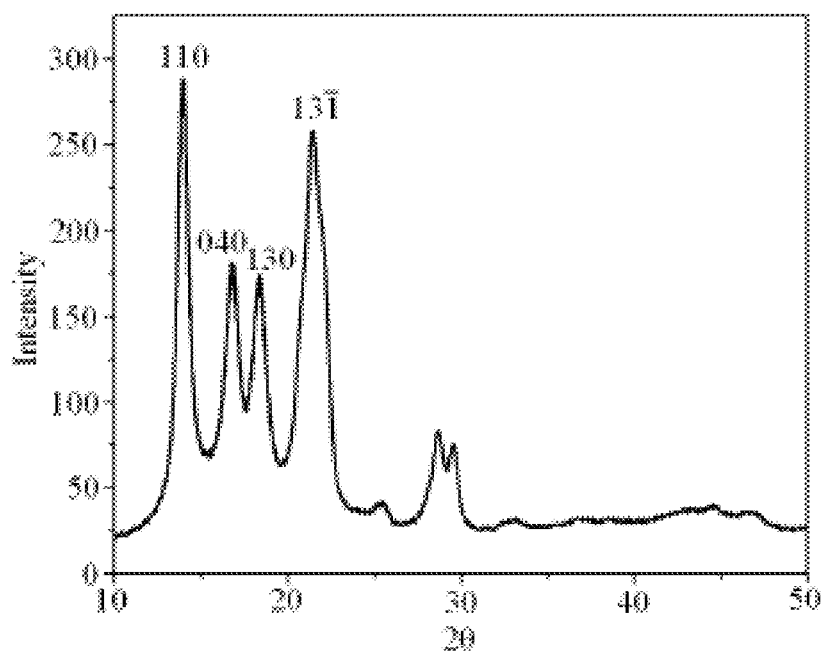
FIG. 12 illustrates an integrated wide angle X-ray diffraction intensity of a polypropylene fiber, in accordance with exemplary embodiments of the present disclosure.

In order to prepare PP SPCs, the processing temperature window was determined by using differential scanning calorimetry and rheological measurements. FIG. 11 shows the DSC thermograms of the PP fiber and the PP matrix. The PP matrix was heated at 10° C./min, and then cooled at 10° C./min; the PP fiber was heated at 10° C./min. There are three important observations. First, the PP fiber begins to melt at 152° C., and there are two melting peaks. One is at 161° C. and the other is at 177° C. The integrated wide angle X-ray diffraction intensity of PP fiber is shown in FIG. 12; only intensity peaks for the typical a-form PP crystals were observed, and the two strong intensity peaks at 2θ of 16.2° and 21.2° generated by the β-crystal form are not observed [21]. FIGS. 13(a)-(d) display the X-ray fiber photographs of heat-treated PP fibers at (a) original, (b), 140° C., (c) 150° C., and (d), 160° C. The 2D wide angle X-ray image of PP fiber was shown in FIG. 13 (a), and it indicates a highly orientated crystalline structure. Schwenker et. al [22] also reported that the drawn PP fiber has two thermal peaks: one at 158° C. and the other at 173° C. They thought that the first peak is crystallization orientation release rising, and the second peak is crystallite melt generating. Second, the PP matrix only has one distinct melting peak at 167° C., and crystallites in PP matrix can be completely melted before 200° C. Third, the PP matrix exhibits a large capability of supercooling. It is observed that the PP matrix begins to crystallize at 124° C., significantly below the melting point. The PP matrix will remain in a molten state or a supercooled molten state until it is cooled to 124° C.

Figure 13A:
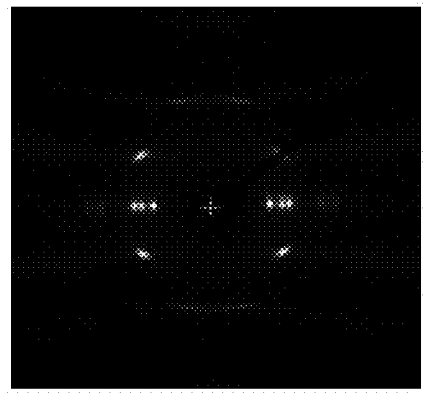
FIGS. 13(a)-(d) illustrate wide angle X-ray diffraction of polypropylene fibers at various temperatures, in accordance with exemplary embodiments of the present disclosure.
Figure 13B:
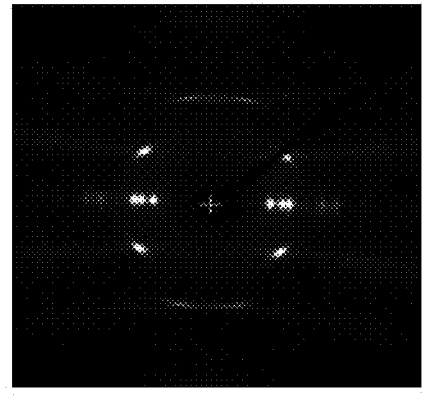
Figure 13C:
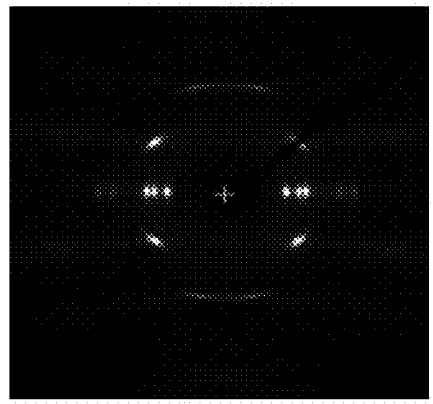
Figure 13D:

With employment of an undercooled melt in SPCs processing, less damage to the fiber strength is anticipated. As shown in the DSC results, the PP fiber begins to melt at 152° C. Since mechanical properties of fibers are related not only to crystallinity but also to crystallization orientation, one needs to further check the level of orientation before determining a suitable process window. The crystallization orientations of the original PP fiber and the heat-treated PP fibers were measured by X-ray. The PP fibers were taken out of the PP fabric heat-treated at different temperature (140, 150, and 160° C.) for 10 min. FIGS. 13(b)-(c) showed that the crystallite orientation of PP fibers heated at 140° C. and 150° C. were hardly changed comparing with the original PP fibers. However, a substantial change was observed when the heating temperature further increased to 160° C., as shown in FIG. 13(d). Therefore, the processing temperature should not exceed 150° C. Otherwise, a large reduction in tensile strength of fibers is expected.

Figure 14:
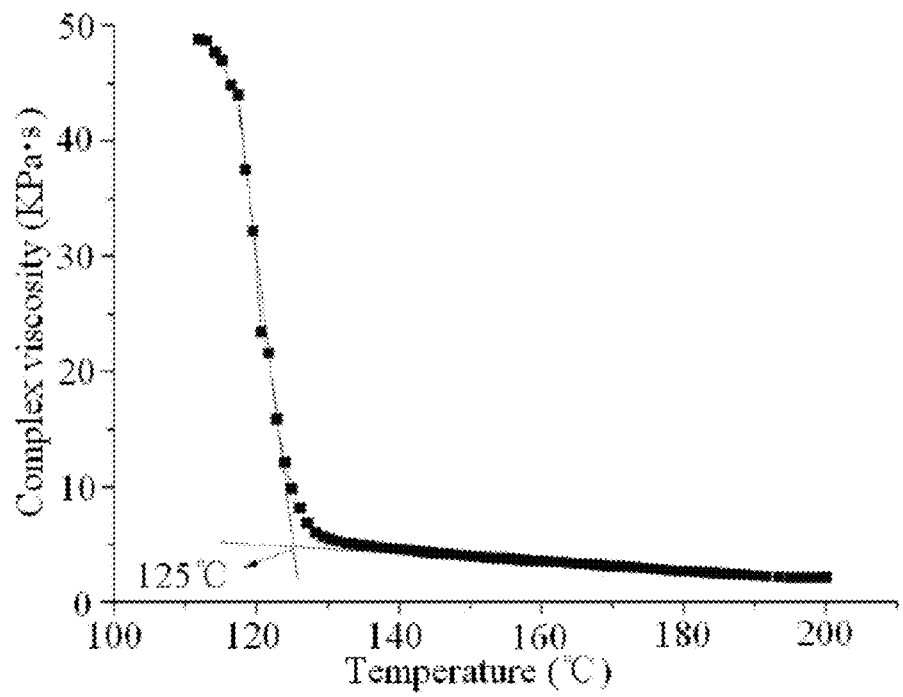
FIG. 14 illustrates the viscosity of polypropylene during cooling, in accordance with exemplary embodiments of the present disclosure.
Figure 15:
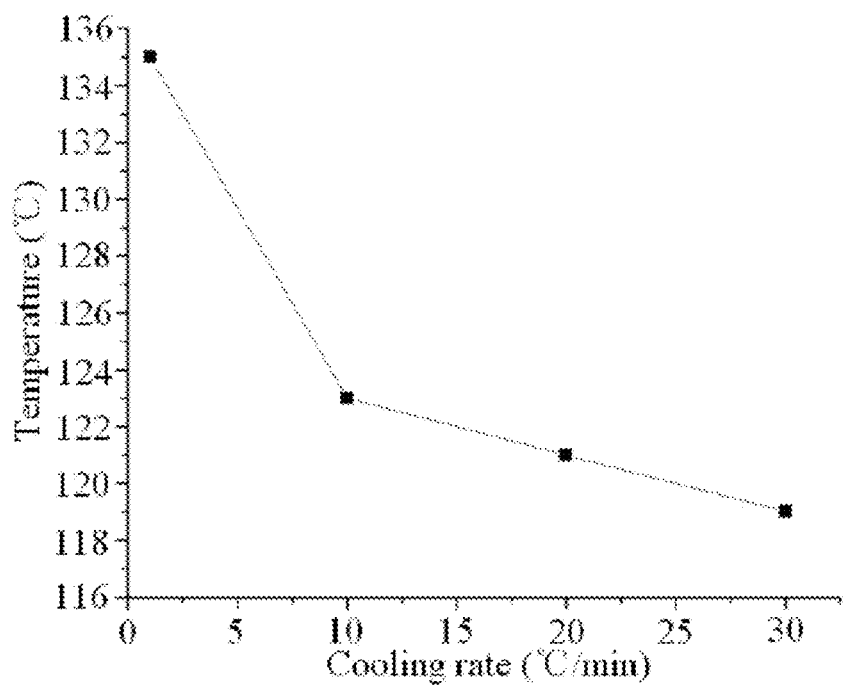
FIG. 15 illustrates the effect of cooling rates on supercooled polypropylene, in accordance with exemplary embodiments of the present disclosure.

FIG. 14 shows the cooling behavior of the PP matrix from a molten state in a plot of complex viscosity versus temperature. The PP matrix was cooled from 200° C. at a rate of 10° C./min. The PP matrix begins to solidify (crystallize) at 125° C., indicated by an abrupt increase in complex viscosity. In this case, the degree of supercooling for the PP matrix exceeded 40° C., compared with its DSC melting point of 167° C. This large degree of supercooling is consistent with the calorimetric results shown in FIG. 11. These results indicate that PP is processable at temperatures well below its melting point, but not below 125° C. Because PP fibers begin to melt at 153° C., the temperature window for processing PP SPCs is between 150° C. 125° C. The two-station process of preparing PP SPCs mentioned above took only about 10 s, It means that the cooling rate during processing must be higher than 10° C./min. FIG. 15 shows the effect of cooling rate on the supercooling of PP. As shown in FIG. 15, the temperature of melting crystallization decreases from 138° C. to 118° C., as the cooling rate increases from 1° C./min to 30° C./min, suggesting that the degree of PP supercooling can be changed by the cooling rate. This result is consistent with the result of Beck and Ledbetter [23] on the effect of cooling rate on the supercooling of polypropylene. Their result showed that there existed a 19° C. difference in peak temperature between the cooling rates of 1° C./min and 33° C./min. To sum up, the higher the cooling rate, the higher the degree of supercooling for polypropylene.

Figure 16:
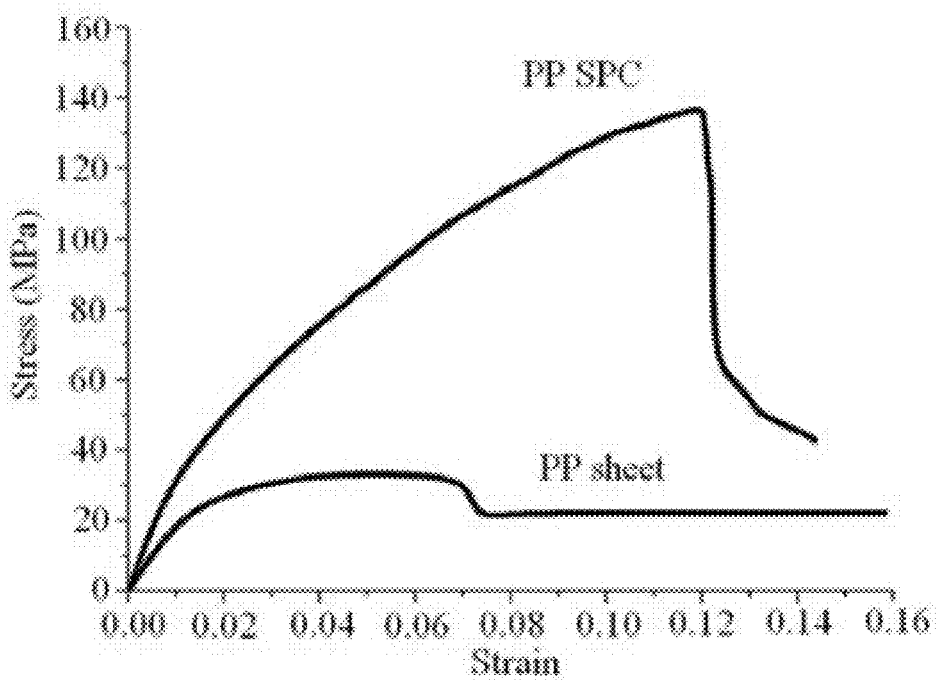
FIG. 16 illustrates stress-strain curves of a PP SPC and a non-reinforced PP sheet, in accordance with exemplary embodiments of the present disclosure.
Figure 17:
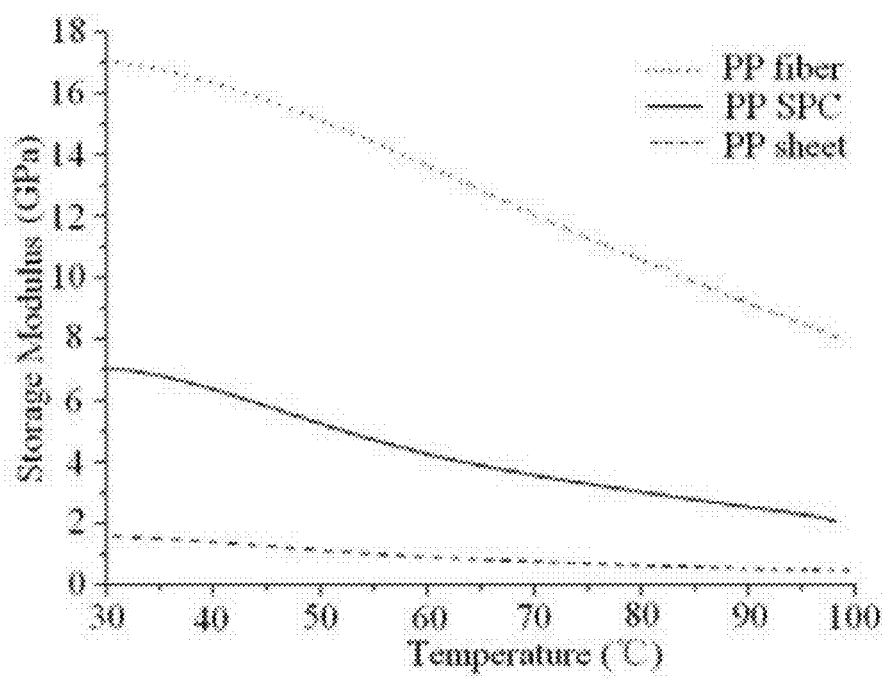
FIG. 17 illustrates temperature scans of various polypropylene materials, in accordance with exemplary embodiments of the present disclosure.

FIG. 16 shows a comparison of stress-strain curves for PP SPC sheets (the weft direction) and non-reinforced PP sheets. The PP SPC was obtained by compression molding at 135° C. The thickness of the PP SPCs is 0.8 mm, and the weight percentage of PP fabric is approximately 42%. As shown in FIG. 16, the non-reinforced PP sheet is ductile and its stress-strain curve contains a yielding and flow region, whereas the PP SPC exhibits a brittle behavior. The maximum stress for PP SPC is 134 MPa, significantly higher than the value of 33 MPa for the non-reinforced PP. The initial linear elastic region also shows a higher yielding strength for the PP SPC than for the non-reinforced PP. FIG. 17 shows the DMTA temperature scans for PP fibers, PP SPC sheets (the weft direction) and non-reinforced PP sheets. The storage modulus of the PP SPC is around 7 GPa at 30° C., falling monotonically to just under 2 GPa at 100° C. The storage modulus of the PP sheet was found to be 1.8 GPa at 30° C. and 0.2 GPa at 100° C. The large decrease in storage modulus in the PP SPC can be correlated with the corresponding modulus reduction of the PP fiber; the storage modulus of the PP fiber dropped from 17 GPa to 8 GPa, as the temperature increased from 30° C. to 100° C. In summary, the PP SPC has much improved mechanical properties than the non-reinforced PP: three times improvement in tensile strength and three times improvement in storage modulus.

Figure 18:
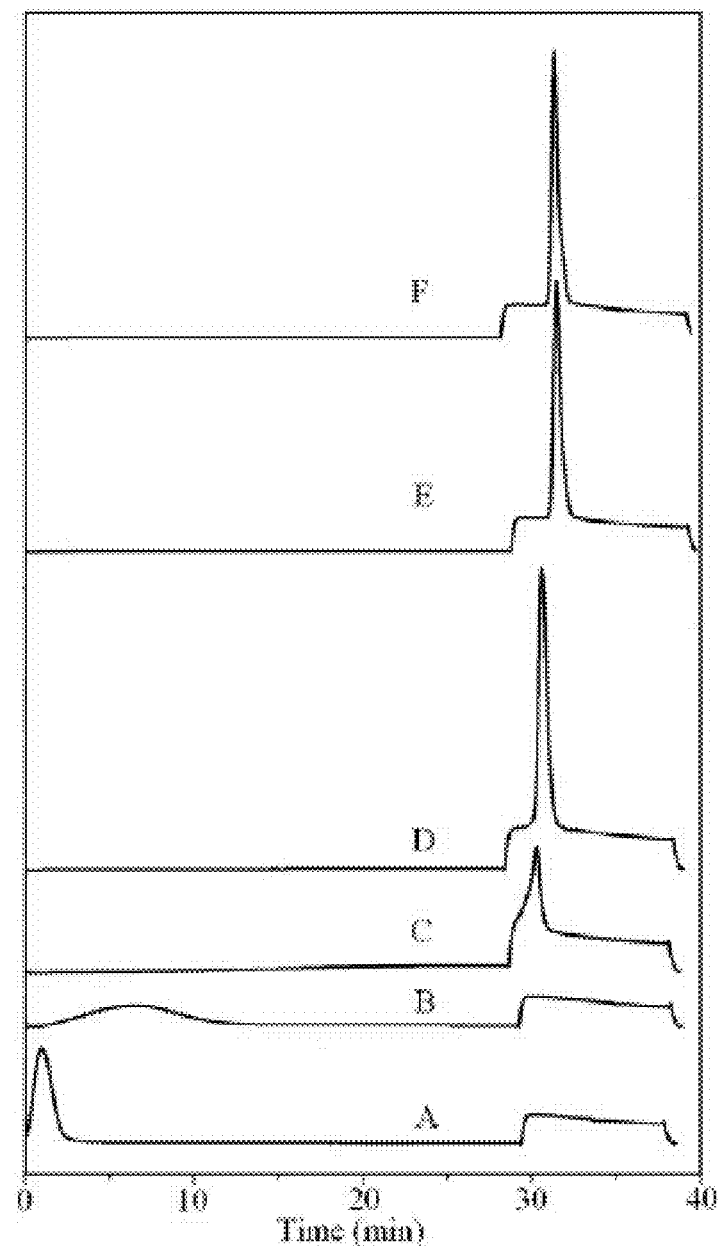
FIG. 18 illustrates heat-flow curves for a polypropylene matrix at different isothermal crystallization temperatures, in accordance with exemplary embodiments of the present disclosure.

As is well known, when preparing fabric-reinforced thermoplastic composites by melt processing, it takes time for the matrix to penetrate the fabric and wet the fibers. When an undercooled polymer melt is used as a matrix material in composites processing, additional concerns would arise since the polymer is now processed below its melting temperature. The critical issue here is whether the molten state can be well kept over time. To address this issue, the isothermal crystallization kinetics of the PP matrix at different temperatures (within the processing temperature window) was studied. FIG. 18 shows the heat flow curves for a PP matrix during isothermal crystallization (isothermal stage) at different temperatures followed by cooling to 40° C. (cooling stage), for the temperature curves: A, 125° C.; B, 130° C.; C, 135° C.; D, 140° C.; E, 145° C.; F, 150° C. As shown in FIG. 18, for both isothermal crystallization temperatures of 125° C. and 130° C., the PP matrix were completely crystallized during isothermal crystallization (for a period of 30 min), as indirectly indicated by the absence of crystallization peaks in the cooling stage. In fact, at 125° C., the crystallization process rapidly completes within the first 2.5 min, indicating that the molten state of the PP matrix is difficult to be maintained at this temperature. At 130° C., the PP matrix begins to crystallize after 1.3 min, and the whole crystallization process takes 14 min to complete. This implies that the molten state can be maintained during the first 1.3 min. When the isothermal crystallization temperature increases, the crystallization process takes a longer time to complete. At 135° C., PP only partially crystallizes during the first 30 min, as indicated by the small crystallization peak in the cooling stage. For even higher isothermal crystallization temperatures, e.g., 145° C. and 150° C., there were no crystallization observable during the 30-min isothermal stage, and there were large crystallization peaks observed during the cooling stage. This means that the molten state of PP can be well maintained for at least half an hour at these temperatures, a condition that is desirable for preparing PP SPCs.

Figure 19:
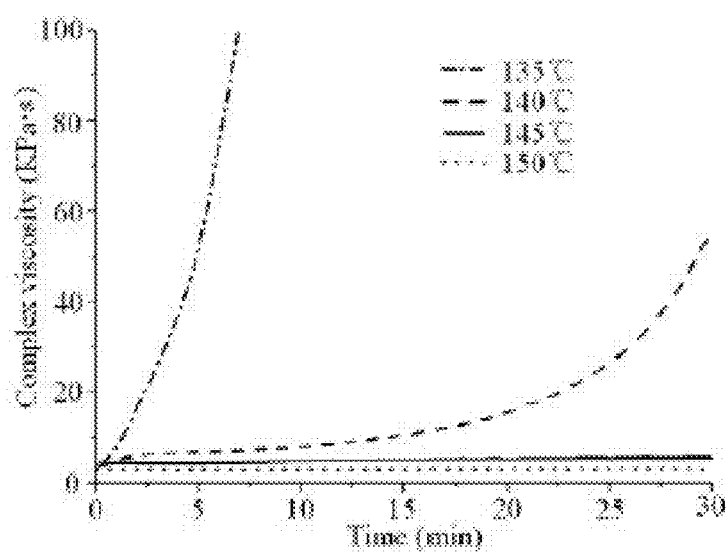
FIG. 19 illustrates viscosities of a polypropylene matrix during cooling, in accordance with exemplary embodiments of the present disclosure.

In composites processing, high fluidity of the matrix is desired for fiber wetting. In order to determine the fluidity of the PP matrix during processing, the complex viscosities of the PP matrix were measured as a function of time during cooling to different set temperatures. The results are shown in FIG. 19. All the samples were cooled at a rate of 10° C./min, the maximum cooling rate achievable by the parallel-plate rotational rheometer. It took the sample 2-3 min to arrive at the stable temperature when the sample was cooled to predetermined temperatures for time sweep rheological measurements. Time sweep rheological measurements cannot be made at 125° C. and 130° C., because the PP matrix solidifies within 2-3 min at these temperatures. However, there could still be sufficient time to prepare PP SPCs, because it took less than 10 s to move the PP sheet from the high temperature platen to the low temperature platen. As shown in FIG. 19, the complex viscosities of PP matrix do not change for half an hour at 145° C. and 150° C., again indicating that the PP matrix can keep its molten state well, consistent with the DSC results shown in FIG. 19. The complex viscosity is higher at 145° C. than at 150° C. The complex viscosity begins to increase after 10 min at the predetermined temperature of 140° C., suggesting that the PP matrix can keep its molten state for about 10 min. The complex viscosity increases rapidly at 135° C., an indication of occurrence of crystallization, and it takes 7 min for the crystallization to finish. To sum up, the lower the predetermined temperature, the more difficult it is for the PP matrix to keep its molten state.

Figure 20A:
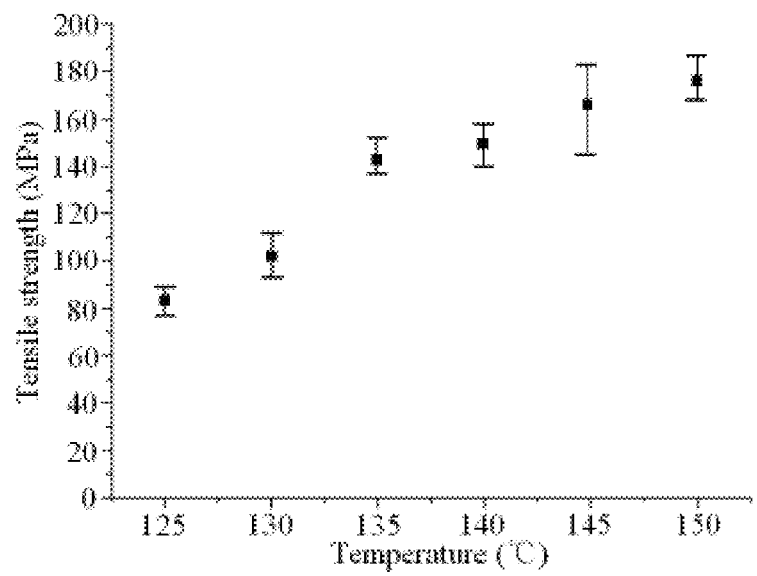
FIGS. 20(a)-(b) illustrate tensile strengths of an SPC, in accordance with exemplary embodiments of the present disclosure.
Figure 20B:
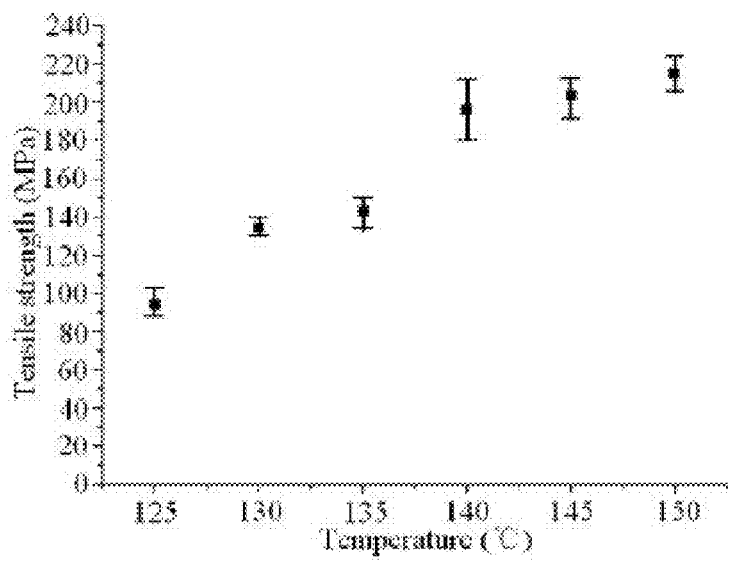

FIGS. 20(a) and (b) shows the tensile strength of the samples made at temperatures in the range from 125 to 150° C. The samples were tested parallel to both the warp direction (FIG. 20 (a)) and weft direction (FIG. 20(b)). The tensile strength in the weft direction is higher than that in the warp direction. This is not surprising since the weft density is larger than the warp density. As the processing temperature increased, the tensile strength increased in both the weft and warp directions. The increase in tensile strength may be correlated with the reduced viscosity and consequently improved wetting of the PP fabric by the PP matrix. As seen in FIG. 19, the lower the processing temperature, the higher the complex viscosity of the PP matrix. The high viscosity can lead to low permeability of the PP matrix and poor wetting of the PP fabric.

Example 5

Alternate Quasi-Melt Extrusion Setup

The quasi-melt extrusion process will be implemented on a single-screw extruder. In the standard single-screw extrusion process, the temperature profile is set up in such a way that the polymer is melted, pumped and then remained at a temperature above Tm before it emerges out of the die orifice/outlet. At least three distinct zones are included on a single-screw extruder: a solid feeding zone, a melting zone, and a pumping and metering zone. The temperature in these zones increases along the extruder. When fibers are involved, they typically enter the extruder, together with polymer pellets, through the hopper. Occasionally, fibers are introduced into the melting zone. This can reduce some adverse effects caused by the different solid conveying properties of fibers and pellets in the solid feeding zone. To extrude SPCs with a quasi-melt, at least two major modifications in process and hardware setup should be incorporated. First, an additional zone is needed for formation of the quasi-melt. Second, a mechanism for adding the fibers into the quasi-melt must be included. Additionally, the added fibers have to be well mixed with the quasi-melt before the mixture reaching the die outlet. The resulting extrusion device should further have an ability of separately varying flow and heat transfer related process conditions. With this ability, the necessary studies on determining a robust process window for formation and extrusion of a quasi-melt can be performed.

Figure 21:
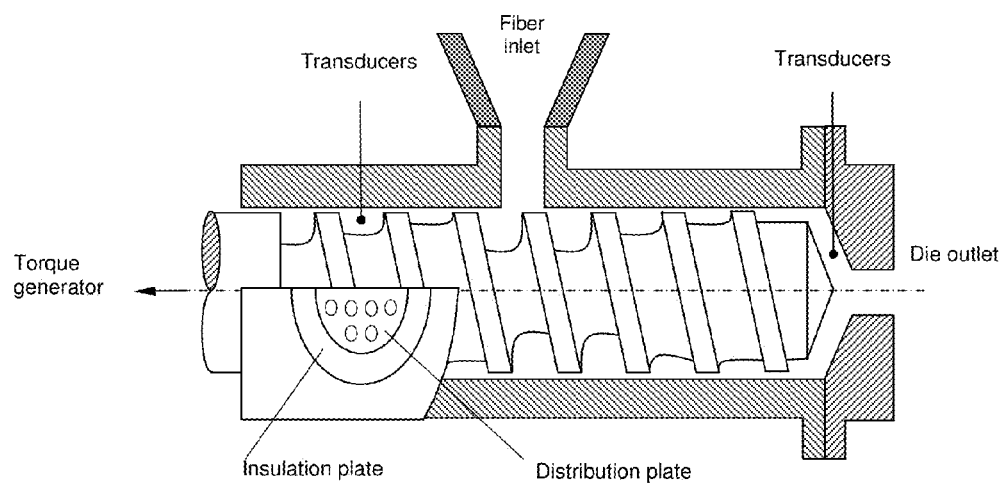
FIG. 21 illustrates an extrusion devices for SPC processing in accordance with exemplary embodiments of the present disclosure.

Rather than directly incorporating the above modifications into the single-screw extruder itself, a modular design will be adopted in the proposed research. The schematic design of this quasi-melt extrusion setup has been given previously in FIG. 2. A special quasi-melt extrusion die can be designed, constructed and mounted to the single-screw extruder. The quasi-melt die performs these functions: 1) creation of a quasi-melt by rapidly cooling the melt, 2) intake of fibers, 3) mixing of fibers with the quasi-melt, 4) provision of controlled thermal and flow conditions. With this approach, the die works as an extender of the barrel and yet provides a separate thermal flow control mechanism for creating and handling the quasi-melt. The proposed design is shown in FIG. 21. The key components include a thermal insulation plate, a flow distribution plate, a die chamber, a rotor or screw, a fiber feeder, and an orifice plate. The insulation plate thermally isolates the die from the extruder, allowing independent control of the temperature inside the die chamber. The flow distribution plate, set at a lower temperature than Tm, hosts a number of small-diameter flow channels, allowing the polymer melt entering the flow channels to quickly cool to the quasi-melt set temperature. Polymer fibers are added to the quasi-melt through a fiber feeder mounted on the die block. The fibers directly enter the recess area on the rotary mixing element. The recess design permits the pressure at this place to decrease to the atmospheric pressure. The fibers can therefore be incorporated into the flow. The pressure is regenerated along the rotary element through compression dragging with the housing of the die. Temperature and pressure transducers are mounted at two locations near the entry end and the exit end of the mixing rotor/screw, as seen in FIG. 21. An existing Brabender torque generator will be used to drive the rotary mixing element. To access the torque generator from the side, the rotary element is placed in the vertical direction to the extruder. This can be seen from the location of the insulation plate (for mounting to the extruder) on the die design.

The following publications in their entireties are hereby incorporated by reference into this application as if fully set forth herein in order to more fully describe the state of the art to which the disclosed matter pertains.

[1] Capiati N J, Porter R S. The concept of one polymer composites modeled with high density polyethylene. J Mater Sci 1975; 10(10):1671-17.
[2] Mead W T, Porter R S. The preparation and tensile properties of polyethylene composites. J Appl Polym Sci 1978; 22(11):3249-65.
[3] Deng M, Shalaby S W. Properties of self-reinforced ultra-high-molecular-weight polyethylene composites. Biomaterials 1997; 18(9):645-55.
[4] Mosleh M, Suh N P, Arinez J. Manufacture and properties of a polyethylene homocomposite. Composites Part A 1998; 29(5-6):611-7.
[5] Hine P J, Ward I M, Olley R H, Bassett D C. The hot compaction of high modulus melt-spun polyethylene fibers. J Mater Sci 1993; 28(2):316-24.
[6] Yan R J, Hine P J, Ward I M, Olley R H, Bassett D C. The hot compaction of spectra gel-spun polyethylene fibre. J Mater Sci 1997; 32(18):4821-32.
[7] Hine P J, Astruc A, Ward I M. Hot compaction of polyethylene naphthalate. J Appl Polym Sci 2004; 93(2):796-802.
[8] Loos J, Peijs T. Processing of single polymer composites using the concept of constrained fibers. Polym Compos 2005; 26(1):114-20.
[9] Mead W T, Roger S, Porter. Annealing characteristics of ultraoriented high-density polyethylene. J Appl Phys 1976; 47(10):4278-88.
[10] Lacroix F V, Loos J, Lu H, Schulte K. Morphological investigations of polyethylene fibre reinforced polyethylene. Polymer 1999; 40 (4):843-47.
[11] Loos J, Schimanski T, Hofman J, Peijs T, Lemstra P J. Morphological investigations of polypropylene single-fibre reinforced polypropylene model composites. Polymer 2001; 42 (8):3827-34.
[12] Loos J, Peijs T. Processing of single polymer composites using the concept of constrained fibers. Polym Compos 2005; 26(1):114-20.
[13] Teishev A, Incardona S, Migliaresi C, Marom G. Polyethylene fibers-polyethylene matrix composites: preparation and physical properties. J Appl Polym Sci 1993; 50(3): 503-12.
[14] Devaux E, Cazé C. Composites of UHMW polyethylene fibres in a LD polyethylene matrix. I. Processing conditions. Compos Sci and Technol 1999; 59(3): 459-66.
[15] Alessandro P, Andrea Z, Claudio M. Preparation and tensile mechanical properties of unidirectional liquid crystalline single-polymer composites. Compos Sci and Technol 2006; 66(13):1970-79.
[16] Yao D, Li R, Nagarajan P. Single-polymer composites based on slowly crystallizing polymers. Polym Eng Sci 2006; 46(9): 1223-30.
[17] Wunderlich B. One hundred years research on supercooling and superheating. Thermochimi Acta 2007; 461(1-2): 4-13.
[18] Done D, Baird D G. The Effect of thermal history on the rheology and texture of thermotropic liquid crystalline polymers. Polyrn Eng Sci 1987; 27(11): 816-22.

[19] Done D, Baird D G. Solidification behavior and recovery kinetics of liquid crystalline polymers. Polym Eng Sci 1990; 30(16):989-95.
[20] Kê, Bacon, Newer Methods of Polymer Characterization. New York, Interscience. 1964, chap. IX
[21] Ellis G, Gomez M A, Marco C. Mapping the crystalline morphology of isotactic polypropylene by infrared microscopy. Internet J Vib Spectro 2001; 5(4): Section 5.
[22] Schwenker R F, J r Beck L R, Zuccarello Rk. American Dyestuff Reporter. 1964; 54(30).
[23] Beck H N, Ledbetter H D. DTA study of heterogeneous nucleation of crystallization in polypropylene. J Appl Polym Sci 1965; 9(6):2131-42.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above-discussed embodiments, and should only be defined by the following claims and all equivalents.

What is claimed is:

1. A process for preparing a single polymer composite, the process comprising:
   heating a single component matrix material to above its $T_m$ to create a polymer melt
   cooling the polymer melt to a temperature $T_q$ below its $T_m$ to create an undercooled polymer melt (also called a quasi-melt), and
   combining the undercooled polymer melt with an enhancing material to form the single polymer composite,
   wherein the matrix material and the enhancing material comprise the same polymer.

2. The process of claim 1, wherein the polymer is a polyolefin, polyamide or polyester.

3. The process of claim 1, wherein the polymer is polypropylene, nylon-6, or PET.

4. The process of claim 1, wherein $T_q$ is at least 10 degrees C below the $T_m$ to create the undercooled polymer melt.

5. The process of claim 1, wherein $T_q$ is at least 20 degrees C below the $T_m$ to create the undercooled polymer melt.

6. The process according to claim 1 wherein the undercooled polymer melt is held at Tq for at least 10 seconds.

7. The process according to claim 1, wherein the enhancing material comprises at least about 10% by weight of the single polymer composite.

8. The process according to claim 1, wherein the enhancing material comprises at least about 25% by weight of the single polymer composite.

9. The process according to claim 1, wherein the enhancing material comprises at least about 40% by weight of the single polymer composite.

10. The process according to claim 1, wherein the enhancing material comprises between about 5% and about 95% by weight of the single polymer composite.

11. The process according to claim 1, further comprising processing the single polymer composite prior to cooling.

12. The process according to claim 11, wherein the processing of the single polymer composite comprises extrusion, injection molding, calendaring, pultrusion, compression molding, or other melt processing steps.

13. A single polymer composite comprising a single component polymer matrix and an enhancing material, wherein the single polymer composite is prepared by the steps of
   heating a polymer compound to above its Tm to create a polymer melt
   cooling the polymer melt to a temperature Tq below its Tm to create an undercooled polymer melt
   combining the undercooled polymer melt with the enhancing material to form the single polymer composite.

14. The single polymer composite of claim 13, wherein the polymer is polypropylene, nylon-6, or PET.

15. The single polymer composite of claim 13, wherein $T_q$ is at least 10 degrees C below the $T_m$ to create the undercooled polymer melt.

16. The single polymer composite of claim 13, wherein $T_q$ is at least 20 degrees C below the $T_m$ to create the undercooled polymer melt.

17. The single polymer composite of claim 13 wherein the undercooled polymer melt is held at Tq for at least 10 seconds.

18. The single polymer composite of claim 13, wherein the enhancing material comprises at least about 10% by weight of the single polymer composite.

19. The single polymer composite of claim 13, further comprising processing the single polymer composite prior to cooling.

20. A single polymer composite comprising a matrix and an enhancing material, wherein the matrix and the enhancing material are both a single polymer selected from a polyolefin, a polyamide or a polyester, and wherein the enhancing material maintains at least 25% of a polymer characteristic in the single polymer composite.

21. The single polymer composite of claim 20, wherein the enhancing material maintains at least 50% of a polymer characteristic in the single polymer composite.

22. The single polymer composite of claim 20, wherein the enhancing material maintains at least 75% of a polymer characteristic in the single polymer composite.

* * * * *